United States Patent Office 3,422,374
Patented Jan. 14, 1969

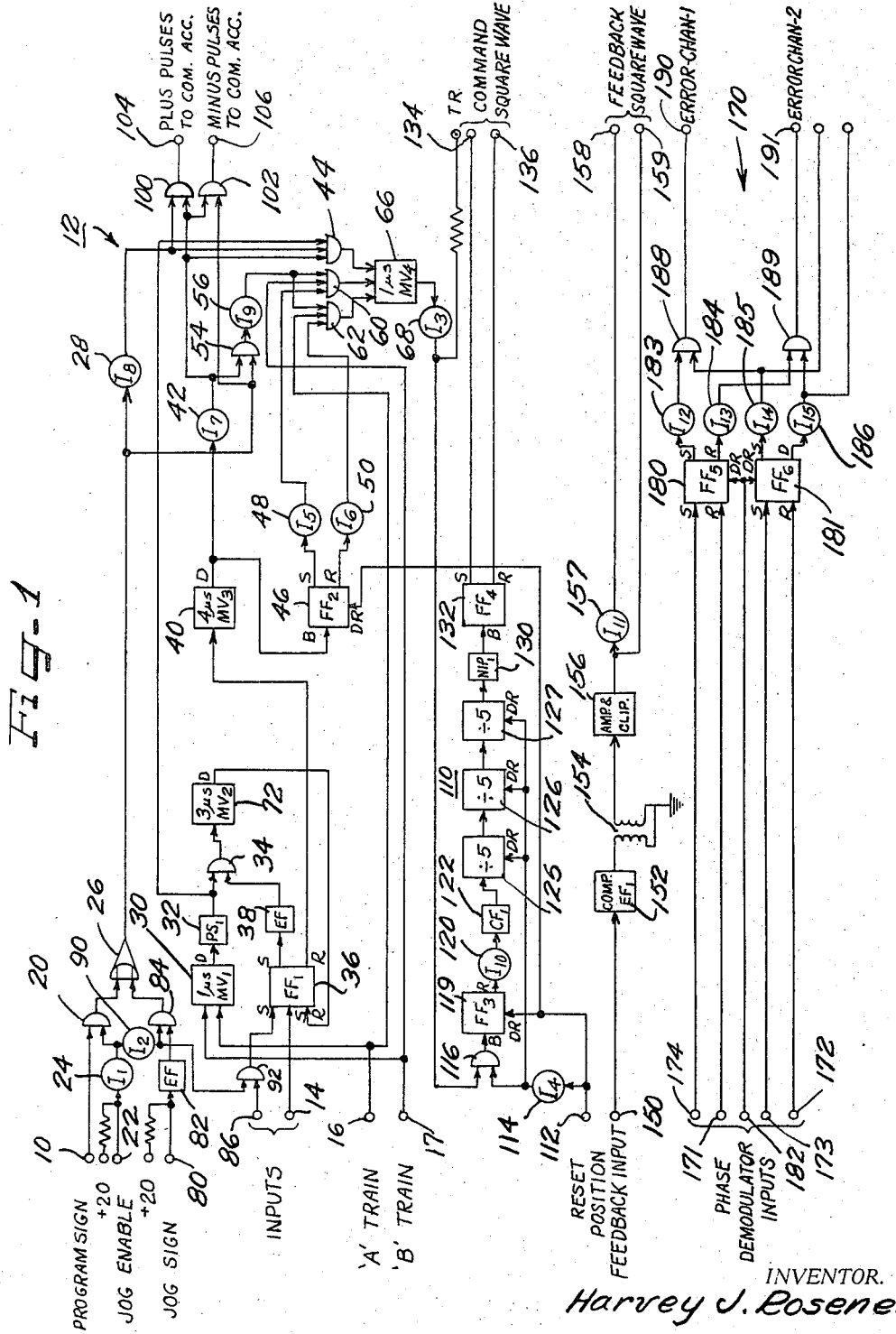

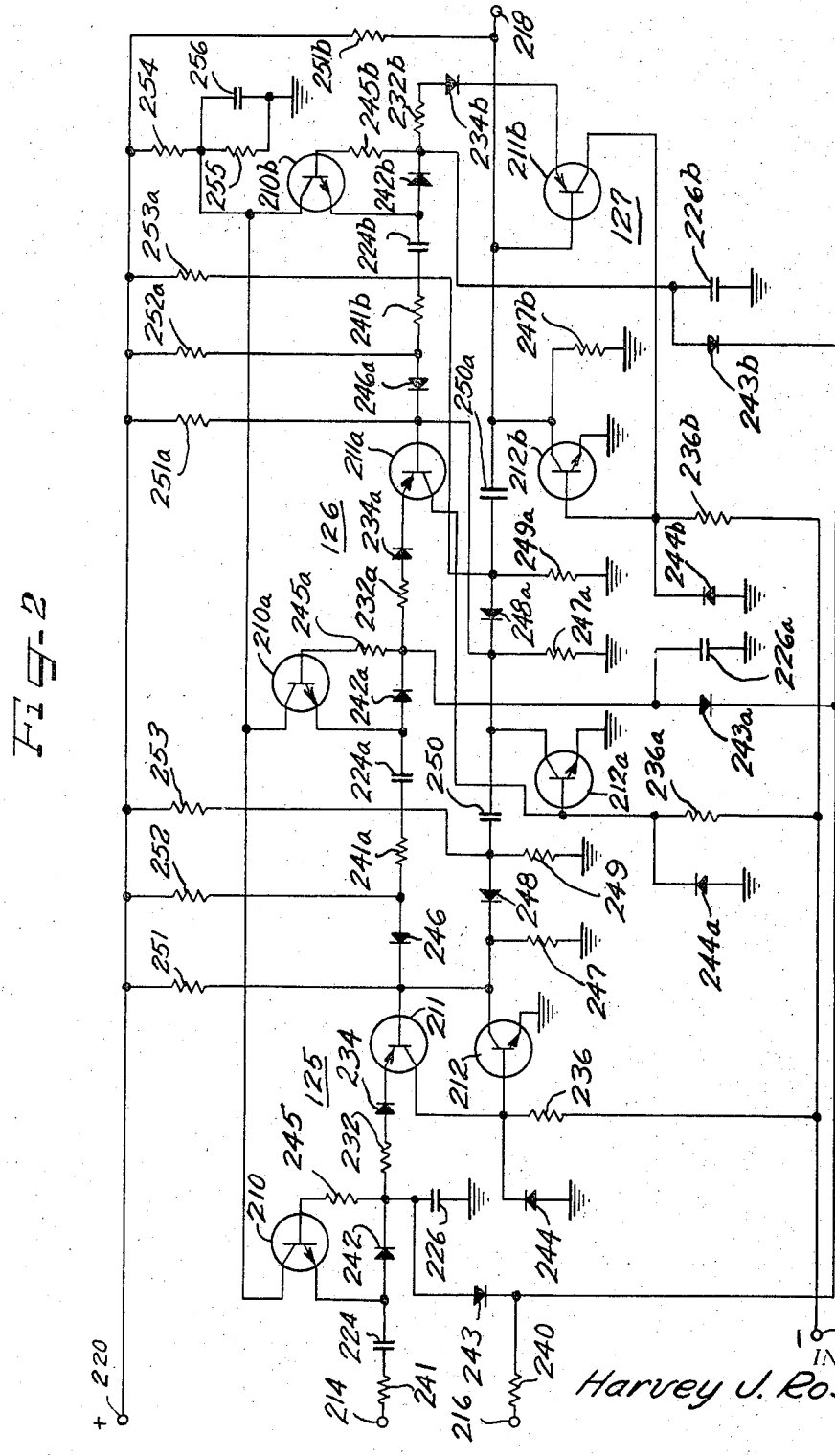

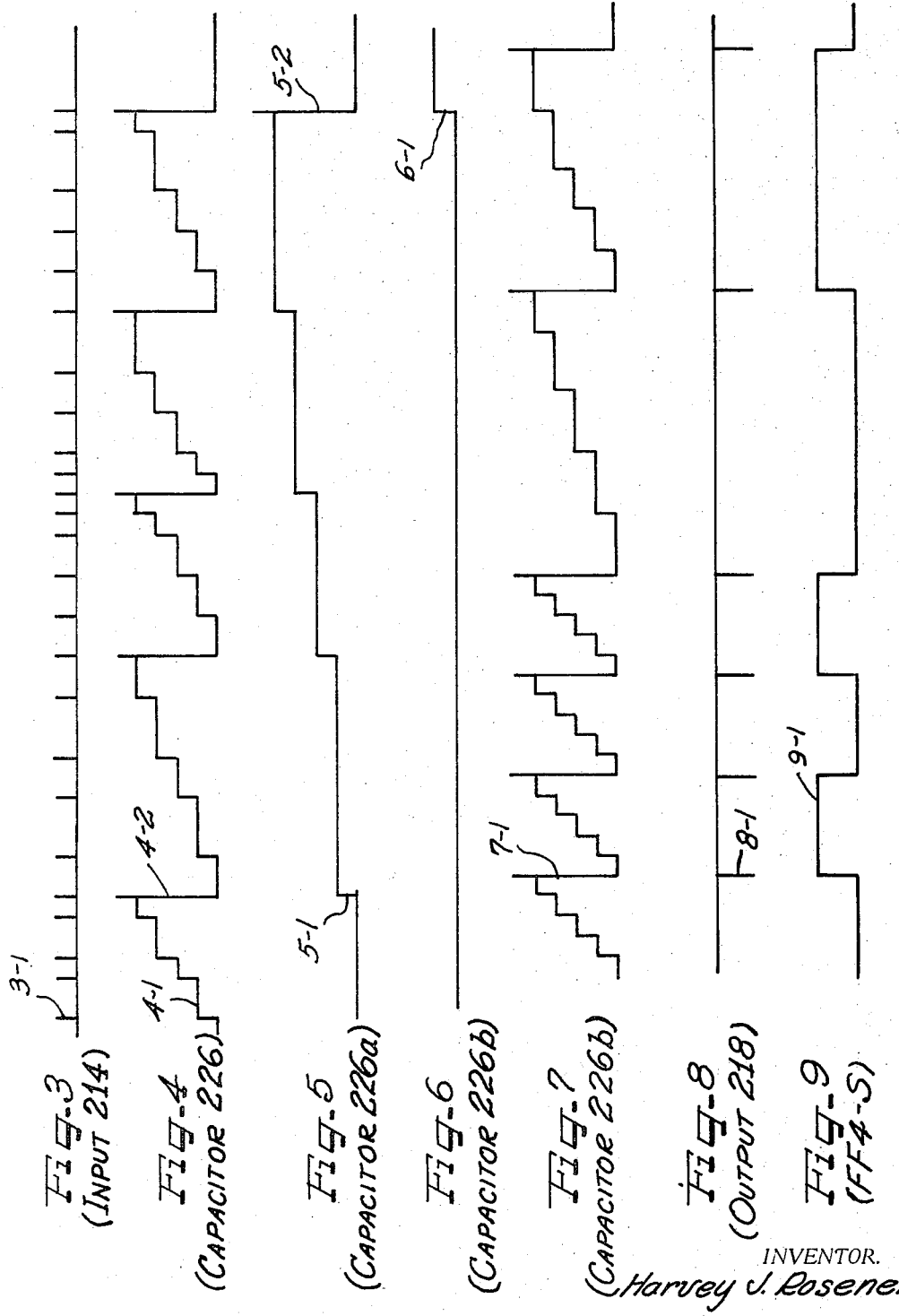

1

3,422,374
PHASE MODULATOR FOR NUMERICAL
CONTROL SYSTEMS
Harvey J. Rosener, Dayton, Ohio, assignor, by mesne assignments, to The Bunker-Ramo Corporation, Stamford, Conn., a corporation of Delaware
Continuation-in-part of application Ser. No. 414,092, Nov. 27, 1964. This application Oct. 21, 1965, Ser. No. 499,736
U.S. Cl. 332—9     6 Claims
Int. Cl. H03k 7/00

ABSTRACT OF THE DISCLOSURE

The illustrated embodiment shows a numerical control system wherein a modulated pulse train is generated by switching back and forth between two out of phase reference pulse trains in response to command pulses. The modulated pulse train is converted to a phase modulated signal by means of a frequency division chain including a binary flip-flop and three divide-by-five stair step energy storage counters, followed by a further binary flip-flop. The final flip-flop stage responds to the output of the stair step counting chain and supplies a square wave signal whose phase is modulated relative to a reference waveform, the reference waveform being generated by a reference frequency division chain of similar construction in response to one of the reference pulse trains.

---

This application is a continuation-in-part of my copending application Ser. No. 414,092 filed Nov. 27, 1964, entitled, "Modulator System and Method."

The present invention relates to a modulator and particularly to an improved phase modulator for numerical control systems.

In the numerical control of machine tools certain commercial systems utilize a phase modulator for converting a train of input pulses into a corresponding phase modulated waveform. Phase modulators of prior numerical control systems have utilized cascaded flip-flops with suitable feedback circuitry to divide the input frequency by a factor of the order of 500. An example of a numerical contouring system utilizing such a phase modulator is found in the McGarrell U.S. Patent No. 3,079,522 issued Feb. 26, 1963.

It is an object of the present invention to provide a phase modulator for numerical control systems which can be implemented with a greatly reduced amount of hardware.

A further object of the invention is to provide a phase modulator which is very economical and yet is capable of responding to input pulses having a time separation of as little as 5 microseconds.

Another object of the invention is to provide a simple and reliable frequency divider for numerical control systems which generates an output rectangular waveform in response to a train of input pulses.

A still further object of the present invention is to provide a frequency divider responsive to input pulses to generate a corresponding alternating waveform output which frequency divider is capable of stable and reliable operation over a temperature range of at least 25° C. to 70° C. and over an input frequency range of the order of 50 kilocycles per second to 200 kilocycles per second.

Still another object of the invention is to provide an improved phase modulator for numerical control systems providing reduced shop and assembly time and reduced testing time as well as reduced initial component costs.

Other objects, features and advantages of the present invention will be apparent from the following detailed description taken in connection with the accompanying drawings, in which:

FIGURE 1 is a logical diagram illustrating a modulator system including a phase modulator in accordance with the present invention;

FIGURE 2 illustrates a preferred step counter circuit for the phase modulator of FIGURE 1;

FIG. 3 is a waveform diagram illustrating the input pulse train supplied at terminal 214 in FIG. 2;

FIG. 4 is a waveform diagram illustrating the potential at capacitor 226, FIG. 2;

FIG. 5 is a waveform diagram illustrating the potential at capacitor 226a, FIG. 2;

FIG. 6 is a waveform diagram showing the potential at capacitor 226b, FIG. 2;

FIG. 7 shows the same waveform over a longer time interval;

FIG. 8 is a waveform diagram showing the output at terminal 218, FIG. 2; and

FIG. 9 illustrates the output waveform at the set (S) output of FF4, FIG. 1.

OVERALL MODULATOR SYSTEM OF FIGURE 1

Modulated pulse train generator

In the illustrated embodiment, the modulator system includes a modulated pulse train generator which is particularly adapted to generate a command pulse train modulated to represent desired increments of movement of a machine tool output element along a given axis in a numerical contouring system. Such a numerical contouring system is illustrated in the McGarrell U.S. Patent 3,079,522 issued Feb. 26, 1963. Said McGarrell patent illustrates a system for generating respective coordinated command pulse signals representing desired movement along respective machine tool axes in accordance with information stored on a punched paper tape or the like. A modulated pulse train generator such as illustrated herein is designed to receive such command input signals relating to a given axis and to generate an output modulated pulse train suitable for actuating a frequency division chain to produce a phase modulated alternating waveform.

When the modulator of the present invention is associated with such a contouring system, the sign of each increment of movement along the axis is obtained from the input medium by means of a tape reader or the like. If the sign of a given increment of movement is positive, a "high" signal will be applied to terminal 10 of the modulator system 12, while if the increment of movement has a negative sign, a "low" signal will be supplied to terminal 10. The increment of movement to be executed is represented by a coded number on the paper tape, and this number is stored and converted to a corresponding number of input command pulses by a system such as illustrated in said U.S. Patent 3,079,522. The series of input command pulses is supplied to terminal 14 of the modulator system 12.

As further illustrated in said McGarrell patent, a 100 kilocycle per second master oscillator generates an A pulse train and a B pulse train with the A pulses occurring alternately with the B pulses and the A pulses having a time spacing of 10 microseconds and the B pulses have a time spacing of 10 microseconds. The A pulse train is supplied to terminal 16 of the modulator 12 while the B pulse train is supplied to terminal 17.

For the case of a positive program sign, gate 20 will have a "high" output. This results from the fact that Jog enable terminal 22 will have a "low" or ground potential applied thereto so that the output of inverter 24 will be "high." Since the output of gate 20 is "high,"

the output of NOR gate 26 will be "low." On the other hand the output of inverter 28 will be "high."

Prior to receipt of an input command pulse at terminal 14, an A pulse at terminal 16 or a B pulse at terminal 17 will trigger monostable multivibrator 30. The delayed output of monostable multivibrator 30 is connected to a pulse shaper circuit 32 which generates an output pulse in response to the falling edge produced by the monostable multivibrator 30. The output pulse from circuit 32 is not transmitted by AND gate 34 because at this time flip-flop 36 is in a reset condition and the set output thereof to emitter follower 38 is in a "low" state. Similarly monostable multivibrator 40 is in its stable condition so that the delayed output thereof is in a "high" condition. The output of inverter 42 is therefore in a "low" condition disabling gate 44 which also receives the output pulses from the pulse shaping circuit 32.

It may be assumed that the flip-flop 46 is in its reset condition so that the set output thereof is "low" and the reset output thereof is "high." The output of inverter 48 is therefore "high" while the output of inverter 50 is "low." Since the output of the NOR gate 26 is "low," AND gate 54 is disabled and its output is "low." Accordingly the output of inverter 56 is "high" partially enabling gates 60 and 62. Since gate 60 is also partially enabled by the output of inverter 48, the B pulses supplied thereto from terminal 17 will be transmitted by gate 60 and actuate the monostable multivibrator 66. Thus, a series of negative pulses of one microsecond duration will appear at the output of monostable multivibrator 66, the pulses having a spacing of 10 microseconds where the B pulses have a spacing of 10 microseconds. This unmodulated pulse train may be inverted by inverter 68 to supply a positive series of pulses which can be fed to a frequency divider chain to generate a command square wave as described in said McGarrell patent.

If the flip-flop 46 has been in set condition, the output of inverter 50 would be "high," and the A pulse train from terminal 16 would have been transmitted to the monostable multivibrator 66.

It will be appreciated that the flip-flop 46 thus controls which of the A pulse train and the B pulse train is transmitted to the monostable multivibrator 66.

Still considering the case of a positive program sign at terminal 10, let it be assumed that an input command pulse is received at terminal 14 which is connected to a set input terminal of flip-flop 36. The input command pulse sets flip-flop 36 thereby enabling gate 34. The next A or B pulse is thus transmitted by gate 34 to a monostable multivibrator 72, and the delayed output of this monostable multivibrator serves to reset flip-flop 36 Upon resetting of flip-flop 36, the reset output thereof goes "high," triggering monostable multivibrator 40. The output of the monostable multivibrator 40 thus goes "low" after a total time delay of about 4 microseconds relative to the occurrence of the A or B pulse triggering monostable multivibrator 30. The output of monostable multivibrator 40 remains "low" for a time interval of 4 microseconds in the illustrated embodiment so as to extend over the time interval of the next succeeding A or B pulse. That is, if an A pulse arrives at gate 34 first after the gate is enabled by the input command pulse, then the output of monostable multivibrator 40 will be "low" at the time of occurrence of the next B pulse. Conversely, if a B pulse had been transmitted by gate 34, the "low" output of monostable multivibrator 40 would occur at the time of the next succeeding A pulse supplied to terminal 16. The low output of monostable multivibrator 40 is converted to a "high" output from inverter 42, but is not transmitted by gate 54 since the output of NOR 26 is "low." (A B pulse supplied to gate 60 would be deleted as will hereinafter be described if the program sign were minus.)

The high output of inverter 42 partially enables gate 44 so that this gate transmits the A or B pulse occurring during the interval when the monostable multivibrator 40 has a "low" output.

Assuming, for example, that an A pulse is transmitted by gate 34 in response to the input command pulse, then the B pulse following 5 microseconds behind such A pulse will be transmitted by gate 44 to monostable multivibrator 66. If the A pulse transmitted by gate 34 is thought of as occurring at time 0 at terminal 16, then the next B pulse will occur at time 5 microseconds. This B pulse at time 5 microseconds will be transmitted by gate 60 without substantial delay and will thus represent a normal unmodulated pulse output from monostable multivibrator 66. However, the B pulse occurring at time 5 microseconds is transmitted by monostable multivibrator 30 through pulse shaper 32, so that a B pulse at time 5 microseconds is transmitted by gate 44 to monostable multivibrator 66.

After the time delay introduced by monostable multivibrator 40, the delayed output thereof returns to a "high" value triggering flip-flop 46, for example from a reset to a set condition. This results in the disabling of gate 60 and in the enabling of gate 62 at a time 8 microseconds after the occurrence of the A pulse at terminal 16, so that the next succeeding A pulse occurring at time 10 microseconds will be transmitted by gate 62. Thus, the supply of an input command pulse to terminal 14 has resulted in the transmission of an additional pulse by gate 44 and has also resulted in a shift from the transmission of B pulses by gate 60 to the transmission of A pulses by gate 62. The B pulse transmitted by gate 60 at time 5 microseconds triggers monostable multivibrator 66, so that the further pulse transmitted by gate 44 at time 5 microseconds will not have an effect on the output of inverter 68. However, monostable multivibrator 66 will deliver a 1 microsecond output pulse beginning at time 5 microseconds and will deliver a further output pulse beginning at time 10 microseconds, so that the input command pulse has had the effect of providing a time spacing between two successive output pulses of about 5 microseconds, after which the normal unmodulated train of pulses having a time spacing of 10 microseconds will be supplied from the modulator in the absence of further command pulses.

In the event that flip-flop 46 were set at the time of receipt of the input command pulse, and where an A pulse occurring at time zero is transmitted by gate 34, an A pulse will be transmitted by gate 62 at time zero, but the A pulse occurring at time ten microseconds will be blocked at gate 62, because at time 7 microseconds, flip-flop 46 will have been reset by the delayed output of monostable 40. In this event, the B pulse occurring at time 5 microseconds at the output of component 32 will be the pulse to triger monostable multivibrator 66. Thus, with flip-flop 46 initially set, the A pulse at time zero produces a negative pulse from monostable multivibrator 66 at time zero, the B pulse transmitted by gate 44 produces a negative output pulse from monstable multivibrator 66 beginning at time 5 microseconds, and thereafter gate 60 will supply B pulses at time 15 microseconds, 25 microseconds and so forth in the absence of further input command pulses.

The operation of the modulator in the event that a B pulse is transmitted by gate 34 in response to an input command pulse will be apparent from the preceding discussion.

For the case where the program sign is "low" so that gate 20 is disabled, the two inputs to NOR gate 26 will be "low," so that the output therefrom will be "high."

If now an input command pulse is received at terminal 14, and an A pulse is transmitted by gate 34 at time zero microsecond, monostable multivibrator 40 will have a "low" output between times three and seven microseconds to provide a "high" output from inverter 42 which is transmitted by gate 54 (gate 54 being enabled by the output of NOR 26). The positive pulse from AND gate 54 between times three microseconds and seven microseconds is inverted by inverter 56 to block gates 60 and 62 in the time interval from three microseconds to seven microseconds. Thus, if flip-flop 46 were reset, the B pulse at terminal 17 occurring at time five microseconds would be blocked by the output of inverter 56. Further, at time seven microseconds, the monostable multivibrator 40 would trigger flip-flop 46 to its set condition, enabling gate 62 so as to transmit the A pulse occurring at time ten microseconds. Since it is assumed that flip-flop 46 was initially reset, the spacing produced would be between a B pulse occurring at time minus five microseconds and the A pulse occurring at time ten microseconds. Accordingly, a minus input command pulse produces a time spacing between successive command output pulses of 15 microseconds.

If with the same conditions just mentioned flip-flop 46 had been initially set, gate 62 would have transmitted an A pulse at zero microseconds, flip-flop 46 would have been reset at time seven microseconds so as to block the A pulse at ten microseconds, and the B pulse at five microseconds would have been blocked at gate 60 because flip-flop 46 was set at time five microseconds. Thus, in this case, with flip-flop 46 initially set, the output from the gates would comprise an A pulse at time zero and then a B pulse at time 15 microseconds, again providing a 15 microsecond spacing between successive output pulses.

The operation of the circuit with a minus program sign and a B pulse transmitted by gate 34 in response to an input command pulse, will be apparent from the foregoing discussion.

For Jog operation, the sign is determined by the input to terminal 80. If a plus sign is desired, terminal 80 is left ungrounded, so that there is a "high" potential input to emitter follower component 82 and to gate 84. On the other hand if a minus sign is desired, terminal 80 is grounded, for example, to provide a "low" input to gate 84 disabling the gate. During Jog operation, the command pulse source is disabled, and a Jog pulse source connected to terminal 86 is enabled to supply a steady stream of Jog command pulses to terminal 86 at a desired frequency. By way of example, the Jog pulses may be supplied by a variable frequency oscillator having a frequency adjustable between two kilocycles per second and 33 kilocycles per second. To initiate Jog operation, ground potential is removed from Jog enable terminal 22 so as to provide a "high" input to inverter 24 and a "low" output from the inverter which disables gate 20. The "low" input to inverter 90 enables gate 84 which then transmits the Jog sign information from terminal 80, in the same way that gate 20 transmitted the program sign information. Thus when the Jog sign is positive, the output of gate 84 will be "high" and the output of NOR 26 will be "low," while when the Jog sign is minus, gate 84 will have a "low" output as will gate 20, providing a "high" output from NOR 26.

The Jog pulses supplied to input terminal 86 are transmitted by gate 92 which is enabled by the "high" output from inverter 90. Thus, each Jog input pulse will serve to set flip-flop 36 and produce the same operation as described in conjunction with program or automatic operation.

COMMAND ACCUMULATOR

The illustrated circuit also includes a pair of gates 100 and 102 having outputs connected to terminals 104 and 106. Since the output of inverter 28 is "high" for positive operation, it will be seen that gate 100 is enabled for a positive program sign or Jog sign. Similarly, since the output of NOR 26 is "high" for a negative sign, it will be apparent that gate 102 will be enabled for a negative program sign or a negative Jog sign. Further, it will be apparent that the positive output pulses from inverter 42 which occur in response to each command input pulse are transmitted to both gates 100 and 102, so that terminals 104 and 106 will receive each positive command pulse and each negative command pulse, respectively. These output terminals 104 and 106 may be connected to a command pulse accumulator which counts in one direction in response to positive input pulses and counts in the opposite direction in response to minus input pulses. With this arrangement, with program operation where the program returns the output element of the system to its initial position at the end of a machining operation or the like, the command accumulator 40 for the axis of movement represented in the drawing should return its count to zero in the absence of an error. In a system in accordance with the present invention, a return to zero indicator lamp is actually associated with the command accumulator so as to indicate that the output element of the system has actually returned to its initial position without error.

PHASE MODULATOR

From the preceding description it will be understood that the output of the inverter 68 is a series of command pulses the number of which per unit time being a function of the distance and direction of movement to be executed by an output element of the system. This modulated command pulse train is converted to a command square wave by means of a phase modulator indicated generally by the reference numeral 110. In operation of the phase modulator, reset terminal 112 is "low" so that the output of inverter 114 is "high" enabling gate 116. Thus the command pulses from inverter 68 are transmitted by gate 116 to the binary input of flip-flop 119 which at the beginning of a cycle is in reset condition. Each two command pulses serve to produce a reset output from the flip-flop which output is transmitted by means of inverter 120 and a suitable inverting type amplifier component 122 (labeled CF1 in FIG. 1) to the input of a series of cascaded divide-by-five stages 125, 126 and 127. In accordance with the present invention, the stages 125–127 are not of a binary counter type, but are of the energy-storage counter type. Preferably the divider stages 125–127 are of the type wherein successive positive-going input pulses transfer successive equal increments of charge to a storage capacitor, the output circuitry of the stage being triggered after five increments of charge have accumulated at the storage capacitor. Where a transistor senses the accumulated voltage of the storage capacitor and becomes conductive after a count of five to discharge the capacitor, the output from the transistor may be a negative pulse which is then differentiated and clipped to transmit a positive actuating pulse to the next stage of the frequency divider. Where the third stage 127 simply transmits the negative pulse without differentiation and clipping, a negative input pulser component 130 may be utilized to transmit a positive pulse in response to the negative-going output pulse from stage 127. Each positive-going pulse from pulser 130 actuates the binary input of a flip-flop 132 so that the flip-flop delivers respective out of phase command square waves to terminals 134 and 136.

Where the storage capacitors of divider stages 125–127 accumulate positive charge, the positive reset pulse at terminal 112 should be inverted as indicated by component 114 so as to insure discharge of the storage capacitors during a resetting operation.

FEEDBACK CIRCUIT

As illustrated in said McGarrell Patent No. 3,079,522, the master 100 kilocycle per second oscillator also supplies a reference frequency divider which specifically receives the A pulse train and divides the same by 500 to provide a 200 cycle per second reference square wave. This reference square wave actuates a sine wave generator to produce a sine wave output of 200 cycles per second. This sine wave output may then supply a manual phase shift resolver and a feedback resolver, the feedback resolver being coupled with the output element for the machine axis with which it is associated. Thus, the output of the feedback resolver is a 200 cycle per second sine wave whose phase relative to the reference frequency is a function of the instantaneous load position. This feedback sine wave may be supplied to position feedback input terminal 150 to drive a complementary emitter follower 152. The output of the component 152 is stepped up approximately 1:2 by transformer 154 and supplied to an amplifier and clipper component 156 whose output will then be a square wave of 200 cycles per second. This output is supplied through an inverter component 157 to terminal 158 and is supplied directly to terminal 159.

PHASE DEMODULATOR

The outputs of the command square wave terminals 134 and 136 and the feed back square wave terminals 158 and 159 are supplied to a phase demodulator arrangement generally designated by the reference numeral 170. More specifically, terminals 134, 136, 158 and 159 may be connected to phase demodulator input terminals 171–174, respectively. Terminal 171 is connected to the reset input of flip-flop 180, terminal 172 is connected to the reset input of flip-flop 181, terminal 173 is connected to the set input of flip-flop 181, and terminal 174 is connected to the set input of flip-flop 180. Terminal 182 is connected to direct coupled reset inputs of flip-flops 180 and 181 for resetting the flip-flops at the beginning of a cycle of operation.

The set output of flip-flop 180 is connected to an inverter 183, the reset output of flip-flop 180 is connected to an inverter 184, the set output of flip-flop 181 is connected to an inverter 185 and reset output of flip-flop 181 is connected to an inverter 186. The outputs of inverters 183 and 185 are connected to inputs of an AND gate 188, and the outputs of inverters 184 and 186 are connected to respective inputs of an AND gate 189. With this arrangement, a series of positive pulses will appear at output terminal 190 when the command square wave at terminal 136 leads the feed back square wave at terminal 159. The width of the output pulses will be proportional to the phase error. When the feed back square wave at terminal 159 leads the command square wave terminal 136, the output will be a series of pulses at terminal 191 with a zero output at terminal 190. Again, the width of the pulses is a function of the phase error. If the output from terminal 191 is inverted, it will be apparent that the output signals will then conform to those of the McGarrell U.S. Patent 3,079,522, so that the remainder of the servo circuitry of the McGarrell patent may be utilized for driving the output element of the axis in a direction so as to tend to bring the feedback square wave into phase with the command square wave.

NOTATION

In the illustrated logic diaigram which assumes "positive logic" the "AND" gates have been consistently illustrated as indicated at 34. The symbol "D" associated with monostable multivibrators 30, 40, 66 and 72 indicates that the output is initially negative going in response to a positive input pulse, the output then becoming positive going after the time delays indicated. The symbol "S" at the input to a flip-flop indicates that the flip-flop will be actuated to set condition by a positive going pulse at the input, but cannot be actuated to a reset condition by a positive going pulse at the input. Similarly, the symbol "R" at the input of a flip-flop indicates that the flip-flop can be reset only by a positive going input pulse. The symbol "S" at the output of a flip-flop indicates that the output terminal will go "high" when the flip-flop is set. Similarly, the symbol "R" at the output of a flip-flop indicates that the output terminal will go "high" when the flip-flop is reset. The symbol "B" at the input to a flip-flop indicates that a positive going pulse supplied to the input will either set or reset the flip-flop, so that a series of positive input pulses to a binary input will alternatively set and reset the flip-flop. The symbol "DR" associated with the flip-flops indicates that a "high" potential will serve to maintain the flip-flop in a reset condition. The symbol "DR" associated with the divider stages 125–127 indicates that a direct coupled potential will serve to maintain the stages in their initial condition. As previously explained, where the dividers operate on the principle of supplying successive increments of positive charge to storage capacitors, the divider stages will be maintained in their initial condition by a "low" signal at the output of inverter 114.

CIRCUIT DETAILS OF THE STAIR STEP FREQUENCY DIVIDER OF FIGURE 2

FIGURE 2 illustrates a detailed preferred circuit for the stages 125, 126 and 127 of FIGURE 1. The first stage 125 comprises transistors 210–212; the second stage 126 comprises transistors 210a–212a; and the third stage 127 comprises transistors 210b–212b.

The terminal 214 in FIGURE 2 of course is connected to the output of the amplifier 122 while terminal 216 is connected to the output of inverter 114. The output terminal 218 of the circuit of FIGURE 2 is connected to the input of the negative input pulser component 130 of FIGURE 1. Supply terminal 220 may be connected to a suitable source of positive potential, for example plus 20 volts. Terminal 221 may be connected to a source of negative potential, for example to minus 20 volts. In other words, terminals 220 and 221 are connected to a direct current power supply of suitable output potential.

A positive going pulse (such as indicated at 3–1, FIG. 3) from component 122 in FIGURE 1 arriving at input terminal 214 results in the charging of capacitors 224 and 226 in series. (In the reference numerals designating the waveforms in FIGS. 3–9, the first number will correspond to the figure number.) At the end of the input pulse, transistor 210 becomes conductive to modify the charge on capacitor 224, so that the next input pulse will transfer an equal quantity of charge to capacitor 226 in spite of the initially higher voltage value of capacitor 226 (indicated at 4–1, FIG. 4). The successive positive input pulses at terminal 214 progressively charge capacitor 226 by successive equal increments (as indicated in FIG. 4) until the charge on capacitor 226 becomes such that transistor 211 becomes conductive. This results at a count of five for the illustrated embodiment.

With transistor 211 conductive, capacitor 226 is rapidly discharged (as indicated at 4–2) through a discharge circuit including resistor 232, diode 234, the emitter-collector circuit of transistor 211 and the base-emitter circuit of transistor 212.

The discharge of capacitor 226 renders transistor 212 conductive to produce a negative output pulse. The main output path to the second stage is translated through an isolated diode 246, resistor 252, and input resistor 241a. To minimize delay time, an additional output of the first stage is differentiated, clipped and coupled to the second stage 126 through diode 248, and capacitor 250.

Each positive going input pulse to the second stage adds an increment of charge to storage capacitor 226a (see 5–1). The output of the first stage 125 essentially gates the second stage 126 so that the step level need not exceed the hook level in the second outer stage 126 for the count to be reset to zero.

Likewise, the hook output from the second stage 126 (as indicated at 5–2) gates the third stage 127 (as indicated at 6–1). In summary, the delay time that does exist from the input of flip-flop 119 of FIGURE 1 to the output of the third stage 127 of FIGURE 2 is a function of the RC time of the first stage 125. In this case, it may be less than 2 microseconds. However, if this had not been acceptable, the first stage 125 could have been gated by the input pulse.

Since the divide by 250 time is coincidental with the falling edge of the output of the third stage 127 (as at 7–1, FIG. 7), negative input pulser 130 is used to generate a positive going pulse (in response to each negative pulse such as indicated at 8–1 in FIG. 8) to trigger the binary input of flip-flop 132. The output of flip-flop 132 is thus 200 cycles per second (as shown in FIG. 9 at 9–1).

The reference counting chain may comprise an identical series as the command counting chain illustrated in FIGURES 1 and 2 including components 119, 120, 122, 125, 126, 127, 130 and 132.

The functions of components 240–253 of the first stage 125 will be apparent from the foregoing description. Component 240 as well as components 254–256 (at the extreme upper right of the drawing associated with the input positive potential line from terminal 220) are common to each of the stages. Components 241–253 have corresponding parts in the second stage 126 which are designated by the reference numeral 241a through 253a. The third stage has components corresponding to components 241–245 and 251 of the first stage and these components have been designated by reference numerals 241b–245b and 251b.

It may be noted that at the present state of the art, it is considered that the emitter follower circuits should utilize silicon transistors so as to operate more satisfactorily at relatively high temperatures. Conventional transistors which were tried in the illustrated circuit did not work well at high temperatures due to leakage from the collector to the base causing the storage capacitor such as indicated at 226 to gain voltage between input pulses. When the transistors in the emitter followers were replaced with silicon ones, a great improvement was apparent.

A counter with the following circuit parameters was found to work properly within a temperature range from 25 degrees C. to 70 degrees C. with input frequencies of 50,000 cycles per second to 200,000 cycles per second. The total number of components was about 60% of the required components for a comparable prior art system. This reduces shop and assembly time as well as initial component costs.

The following circuit parameters are given merely by way of preferred illustration and not by limitation:

| Components: | | Value for each component |
|---|---|---|
| 224 | micromicrofarads | 330 |
| 224a | do | 1500 |
| 224b | microfarads | .022 |
| 226 | micromicrofarads | 1200 |
| 226a | microfarads | .005 |
| 226b | do | .1 |
| 232, 232a, 232b | ohms | 220 |
| 236, 236a, 236b | do | 47,000 |
| 240 | do | 220 |
| 241, 241a, 241b | do | 220 |
| 245, 245a, 245b | do | 1000 |
| 247 | do | 15,000 |
| 247a | do | 9,100 |
| 247b | do | 9,100 |
| 249, 249a | do | 12,000 |
| 250, 250a | microfarads | .0033 |
| 251, 251a | ohms | 10,000 |
| 251b | do | 5,100 |
| 252, 252a | do | 2,200 |
| 253, 253a | do | 68,000 |
| 254 | do | 220 |
| 255 | do | 2,200 |
| 256 (25 volts) | microfarads | 10 |

MODIFICATIONS AND DEFINITIONS

It will be understood that the logical diagram of FIGURE 1 is based on so-called "positive logic." Thus the various logic components (except component 32) are actuated by positive-going pulses. The same functions could be performed utilizing so-called "negative logic."

While monostable multivibrators 30 and 66 have been utilized for convenience in providing suitable output pulses for the system, it will be understood that other suitable circuitry may be substituted therefor.

The term phase modulator as utilized in the claims is considered to comprehend an overall system which generates a reference waveform and one or more command waveforms whose phase is modulated relative to the reference waveform. The concepts of the present invention are applicable to the reference frequency divider component and/or one or more command frequency divider components of such a phase modulator. Of course, the optimum advantage is obtained when each frequency division chain of the phase modulator is constructed in accordance with the teachings of this invention. It will be understood that the output analog signals from the phase modulator need not be of alternating polarity, but need only fluctuate between two distinct amplitude levels. The output signals from the phase modulator may ultimately be supplied to a phase demodulator as unidirectional rectangular waveforms or as alternating polarity sine wave signals, for example. The term alternating waveform as used herein is intended to cover waveforms which alternate between two extreme amplitude levels whether or not such amplitude levels are of opposite polarity.

It will be apparent that many modifications and variations may be effected without departing from the scope of the novel concepts of the present invention.

I claim as my invention:

1. In a numerical control system including:
command pulse generating means for generating a series of pulses representing a given command, and
phase modulator means connected to said command pulse generating means for providing an output signal whose phase is a function of the number of pulses in said series, the improvement characterized by said phase modulator means comprising
a cascade chain comprising approximately three step counter stages, each stage having a charge storage capacitance for accumulating successive charge increments in response to successive input pulses until a predetermined threshold is exceeded and means for discharging said charge storage capacitance and transmitting an output signal in response to the charge on said capacitance exceeding said predetermined threshold, said chain of step counters, said chain having an input for receiving said series of pulses from said command pulse generating means and having an output for supplying an output signal each time a predetermined number of pulses of the order of 125 is supplied to the input of said chain, and
electronic bistable means having an input connected to the output of said cascade chain of step counters and having an output for supplying a phase modulated signal in accordance with the number of pulses generated by said command pulse generating means,
said bistable means being responsive to successive output signals from said cascade chain of step counters to generate an output waveform which alternate between first and second output levels.

2. In a numerical control system including:
command pulse generating means for generating a series of pulses representing a given command, and
phase modulator means connected to said command pulse generating means for providing an output signal whose phase is a function of the number of pulses in said series, the improvement characterized by said phase modulator means comprising
a cascade chain of step counters, said chain having an input for receiving said series of pulses from said command pulse generating means and having an output for supplying an output signal each time a predetermined number of pulses is supplied to the input of said chain, and
electronic bistable means having an input connected to the output of said cascade chain of step counters and having an output for supplying a phase modulated signal in accordance with the number of pulses generated by said command pulse generating means, said bistable means being responsive to successive output signals from said cascade chain of step counters to generate an output waveform which alternates between first and second output levels, and each step counter comprising electric charge storage means having an initial level of electric charge and adding successive increments of electric charge in response to successive input pulses up to a predetermined maximum number of increments of electric charge of the order of five, and means for generating an output signal and for restoring said electric charge storage means to said initial level of electric charge each time said electric charge storage means has accumulated said predetermined maximum number of increments of electric charge.

3. A phase modulator comprising:

a cascade chain of step counter stages, each stage having a charge storage capacitor for storing successive increments of charge in response to successive input pulses, and means for discharging the capacitor and transmitting an output signal in response to a predetermined number of input pulses, said chain having an input for receiving a series of input pulses and having an output for supplying an output signal each time a predetermined number of pulses is supplied to the input of said chain, and electronic bistable means having an input connected to the output of said cascade chain of step counters and having an output for supplying a phase modulated signal in accordance with the number of pulses supplied to the input of said cascade chain of step counters, said bistable means being responsive to successive output signals from said cascade chain of step counters to generate an output waveform which alternates between first and second output levels.

4. A phase modulator comprising:

a cascade chain of step counters, said chain having an input for receiving a series of input pulses and having an output for supplying an output signal each time a predetermined number of pulses is supplied to the input of said chain, and electronic bistable means having an input connected to the output of said cascade chain of step counters and having an output for supplying a phase modulated signal in accordance with the number of pulses supplied to the input of said cascade chain of step counters, said bistable means being responsive to successive output signals from said cascade chain of step counters to generate an output waveform which alternates between first and second output levels, and each step counter comprising electric change storage means having an initial level of electric charge and adding successive increments of electric charge in response to successive input pulses up to a predetermined maximum number of increments of electric charge of the order of five, and means for generating an output signal and for restoring said electric charge storage means to said initial level of electric charge each time said electric charge storage means has accumulated said predetermined maximum number of increments of electric charge.

5. A phase modulator for numerical control systems comprising:

command and reference frequency dividers each providing a division ratio of the order of 500, and supplying respectively a command output signal and a reference output signal, said frequency dividers each comprising a cascade chain of step counters, each step counter having a maximum count of the order of five, and the number of counters in each chain being of the order of three, and means connected to the command and reference frequency dividers for generating an output signal in accordance with any phase difference between said command and reference output signals.

6. A phase modulator for numerical control systems comprising:

command and reference frequency dividers each providing a division ratio of the order of 500, and supplying respectively a command output signal and a reference output signal, said frequency dividers each comprising a cascade chain of step counters, each step counter having a maximum count of the order of five, and the number of counters in each chain being of the order of three, and means connected to the command and reference frequency dividers for generating an output signal in accordance with any phase difference between said command and reference output signals, each step counter comprising electric charge storage means having an initial level of electric charge and adding successive increments of electric charge in response to successive input pulses up to a predetermined maximum number of increments of electric charge of the order of five, and means for generating an output signal and for restoring said electric charge storage means to said initial level of electric charge each time said electric charge storage means has accumulated said predetermined maximum number of increments of electric charge.

References Cited

UNITED STATES PATENTS

| | | | |
|---|---|---|---|
| 2,970,226 | 1/1961 | Skelton et al. | 307—88.5 |
| 2,994,790 | 8/1961 | Delaney | 332—9 X |
| 3,082,332 | 3/1963 | Smeltzer et al. | 307—88.5 |
| 3,117,280 | 1/1964 | Palmer | 328—155 X |
| 3,172,042 | 3/1965 | Dawirs | 328—48 |

ALFRED L. BRODY, *Primary Examiner.*

U.S. Cl. X.R.

307—221, 225; 325—325; 328—41, 45, 37, 48, 155; 332—16